United States Patent
Del Gaizo et al.

(10) Patent No.: US 10,589,804 B2
(45) Date of Patent: Mar. 17, 2020

(54) REAR DIFFUSER SYSTEM FOR AN AUTOMOTIVE VEHICLE

(71) Applicant: GM GLOBAL TECHNOLOGY OPERATIONS LLC, Detroit, MI (US)

(72) Inventors: Steven A. Del Gaizo, Madison Heights, MI (US); John H. Bednarchik, Royal Oak, MI (US); Suzanne M. Cody-Gump, Metamora, MI (US); Donnell B. Johnson, Warren, MI (US); Darren T. Luke, West Bloomfield, MI (US); Danilo A. Oliveira, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 65 days.

(21) Appl. No.: 15/969,203

(22) Filed: May 2, 2018

(65) Prior Publication Data

US 2019/0337577 A1     Nov. 7, 2019

(51) Int. Cl.
*B62D 35/00* (2006.01)
*B62D 35/02* (2006.01)

(52) U.S. Cl.
CPC ........... *B62D 35/007* (2013.01); *B62D 35/02* (2013.01)

(58) Field of Classification Search
CPC ...... B62D 35/007; B62D 35/02; B62D 37/02; B60R 13/06
USPC ................ 296/180.1, 180.5, 181.5
See application file for complete search history.

(56) References Cited

U.S. PATENT DOCUMENTS

| | | | | |
|---|---|---|---|---|
| 6,575,522 B2* | 6/2003 | Borghi | ................. | B62D 35/005 296/180.5 |
| 7,055,891 B2* | 6/2006 | Jungert | ................ | B62D 35/005 296/180.5 |
| 8,731,781 B2* | 5/2014 | Prentice | ................. | B62D 35/02 701/49 |
| 8,882,176 B2* | 11/2014 | Froling | .................. | B62D 35/02 296/180.1 |
| 9,561,827 B2* | 2/2017 | Parry-Williams | ...... | B62D 37/02 |

* cited by examiner

*Primary Examiner* — Jason S Morrow
*Assistant Examiner* — E Turner Hicks

(57) ABSTRACT

An automotive vehicle includes a body having a fore portion, an aft portion, and an underbody portion. The vehicle additionally includes a panel pivotably coupled to the underbody portion proximate the aft portion of the body. The panel has a fore edge and an aft edge and is pivotable about the fore edge. The panel is pivotable between a stowed position and a deployed position. In the stowed position the aft edge is spaced a first distance from a driving surface and in the deployed position the aft edge is spaced a second distance from the driving surface. The second distanced is less than the first distance. The vehicle additionally includes an actuator configured to move the panel between the stowed position and the deployed position in response to satisfaction of an operating condition.

8 Claims, 3 Drawing Sheets

REAR DIFFUSER SYSTEM FOR AN AUTOMOTIVE VEHICLE

TECHNICAL FIELD

The present disclosure relates to automotive vehicles, and more particularly to aerodynamic features of automotive vehicles.

INTRODUCTION

Road vehicles have a body with an underbody portion proximate the road surface. A diffuser, in an automotive context, is a shaped section of the vehicle underbody which improves the vehicle's aerodynamic properties by enhancing transition between high-velocity airflow underneath the car and the significantly slower free-stream airflow of the ambient atmosphere. The diffuser generally affects pressure under the vehicle body as the vehicle moves through the air to increase effective downforce and drag on the vehicle.

The diffuser is typically located at the aft part of a vehicle underbody and works by accelerating the velocity of the airflow underneath the vehicle. The diffuser works by providing a space for the underbody airflow to decelerate and expand into an area covered by the vehicle while air density remains constant. Specifically, the diffuser uses Bernoulli's principle, according to which fluid pressure decreases as velocity of the fluid increases. Therefore, the diffuser causes the pressure below the vehicle to be lower than on the side and above the vehicle, thereby generating a measure of downforce.

When a diffuser is used, the air flows into the underbody from the front and sides of the vehicle, following which the air accelerates and reduces pressure under the vehicle. A suction peak is generated at the transition from the underbody to the diffuser. The diffuser then eases the high velocity underbody air back to the velocity of the free-stream airflow moving past the vehicle and also helps fill in the wake area immediately behind the vehicle. As a result, the diffuser reduces drag and increases downforce on the vehicle by making the whole vehicle underbody a more efficient downforce producing device. Additionally, the diffuser imparts upward momentum to the air aft of the vehicle, which further increases downforce on the vehicle

SUMMARY

An automotive vehicle according to the present disclosure includes a body having a fore portion, an aft portion, and an underbody portion. The vehicle additionally includes a panel pivotably coupled to the underbody portion proximate the aft portion of the body. The panel has a fore edge and an aft edge and is pivotable about the fore edge. The panel is pivotable between a stowed position with a first angle relative to a driving surface and a deployed position with a second angle relative to the driving surface. In the stowed position the aft edge is spaced a first distance from the driving surface and in the deployed position the aft edge is spaced a second distance from the driving surface. The second distanced is less than the first distance. The vehicle additionally includes an actuator configured to move the panel between the stowed position and the deployed position in response to satisfaction of an operating condition.

In an exemplary embodiment, the panel comprises a first portion slidably coupled to a second portion, with the first portion and second portion being slidable between a retracted position defining a first length between the fore edge and the aft edge and an extended position defining a second length between the fore edge and the aft edge. The second length exceeds the first length. Such embodiments may additionally include a second actuator configured to slide the first portion and the second portion between the retracted position and the extended position.

In an exemplary embodiment, the vehicle additionally includes a first axle and a second axle, with the fore edge being disposed proximate the second axle.

In an exemplary embodiment, the vehicle additionally includes a controller configured to control the actuator to move the panel between the stowed position and the deployed position in response to satisfaction of the operating condition. In such embodiments, the operating condition may include vehicle speed exceeding a predefined threshold. The operating condition may also include an anticipated rear impact.

In an exemplary embodiment the actuator comprises an inflatable diaphragm configured to, when inflated, pivot the panel to the deployed position.

A method of controlling a vehicle according to the present disclosure includes providing a vehicle having an aft portion, an underbody portion, a panel pivotably coupled to the underbody portion proximate the aft portion of the body, at least one actuator configured to move the panel between a stowed position and a deployed position, and a controller configured to control the at least one actuator. The panel has a fore edge and an aft edge and is pivotable about the fore edge. The method additionally includes, in response to satisfaction of a first operating condition, automatically controlling the at least one actuator, via the controller, to move the panel from the stowed position to the deployed position. The method further includes, in response to satisfaction of a second operating condition, automatically controlling the at least one actuator, via the controller, to move the panel from the deployed position to the stowed position. In the stowed position the aft edge is spaced a first distance from a driving surface and in the deployed position the aft edge is spaced a second distance from the driving surface, with the second distance being less than the first distance.

In an exemplary embodiment, the panel comprises a first portion slidably coupled to a second portion, with the first portion and second portion being slidable between a retracted position defining a first length between the fore edge and the aft edge and an extended position defining a second length between the fore edge and the aft edge. The second length exceeds the first length. In such embodiments, automatically controlling the at least one actuator to move the panel from the stowed position to the deployed position comprises controlling the at least one actuator to move the panel from the retracted position to the extended position, and automatically controlling the at least one actuator to move the panel from the deployed position to the stowed position comprises controlling the at least one actuator to move the panel from the extended position to the retracted position.

In an exemplary embodiment, the first operating condition includes vehicle speed exceeding a predefined threshold, and the second operating condition includes vehicle speed falling below the predefined threshold.

In an exemplary embodiment, the first operating condition comprises an anticipated rear impact.

Embodiments according to the present disclosure provide a number of advantages. For example, the present disclosure provides a system and method for providing enhanced aerodynamic performance when desired, and moreover may do so without compromising desired vehicle styling.

The above and other advantages and features of the present disclosure will be apparent from the following detailed description of the preferred embodiments when taken in connection with the accompanying drawings.

DETAILED DESCRIPTION

Figure 1:
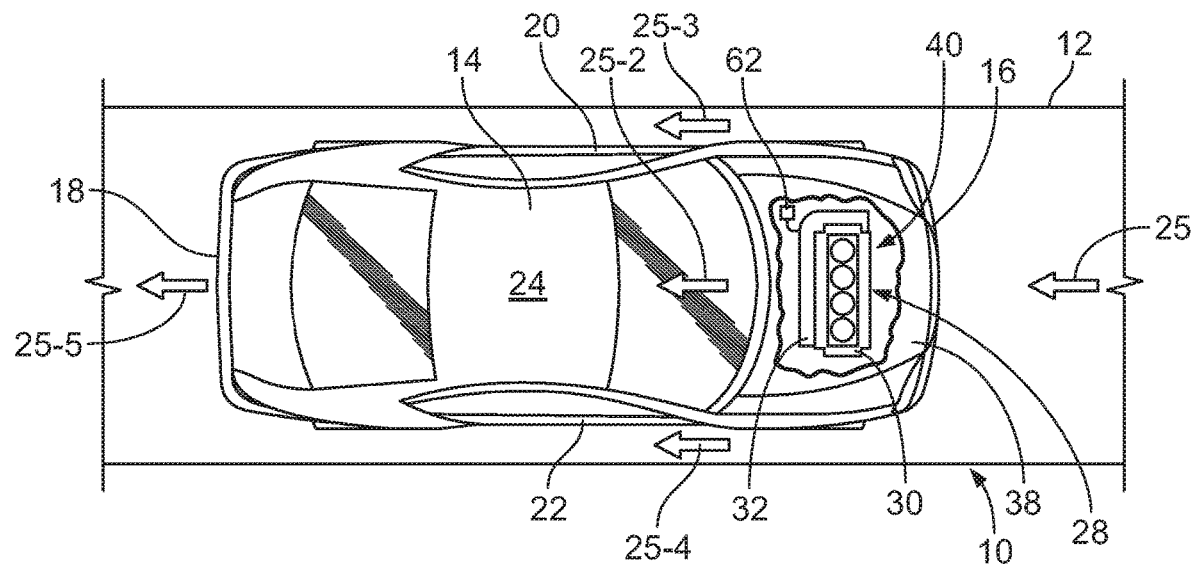
FIG. 1 is a top view of an automotive vehicle according to an embodiment of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Referring now to FIGS. 1 through 4, a first embodiment of an automotive vehicle 10 according to the present disclosure is illustrated. The motor vehicle 10 is positioned proximate to a road surface 12. The vehicle 10 includes a vehicle body 14. The vehicle body 14 defines six body sides. The six body sides include a first body end 16, which may be referred to as a fore end or front end 16, an opposing second body end 18, which may be referred to as an aft end or rear end 18, a left side 20, and a right side 22, a top body portion 24, which frequently includes a vehicle roof, and an underbody portion 26 (shown in FIG. 2). As understood by those skilled in the art, the fore end 16 is configured to face oncoming ambient airflow 25 when the vehicle is in motion relative to the road surface 12.

Figure 2:
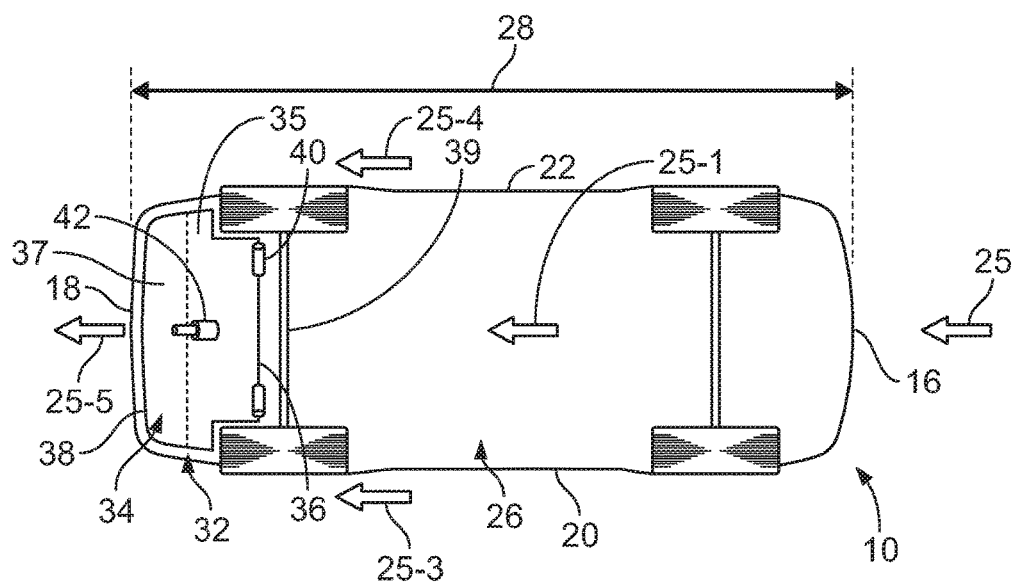
FIG. 2 is a bottom view of an automotive vehicle according to an embodiment of the present disclosure.

As shown in FIG. 2, the underbody portion 26 is configured to span a distance 28 between the front and rear body ends 16, 18. The underbody portion 26 may have a substantially flat surface and have components of various subsystems, for example of an engine exhaust system and a vehicle suspension (not shown), tucked into specially configured crevices, such that a first airflow portion 25-1 may flow past the vehicle body 14 with limited disturbance. The underbody portion 26 also defines an underbody space between the vehicle body 14 and the road surface 12. Accordingly, the underbody space permits the first airflow portion 25-1 to pass under the vehicle body 14, between the vehicle body 14 and the road surface 12, while a second airflow portion 25-2 passes over the top body portion 24. Furthermore, third and fourth airflow portions 25-3, 25-4 pass around the left and right sides 20, 22, respectively. The airflow portions 25-1, 25-2, 25-3, and 25-4 all rejoin behind the rear end 18 in a wake area or recirculating airflow region 25-5 immediately behind the rear end 18 of the moving vehicle.

Figure 3:
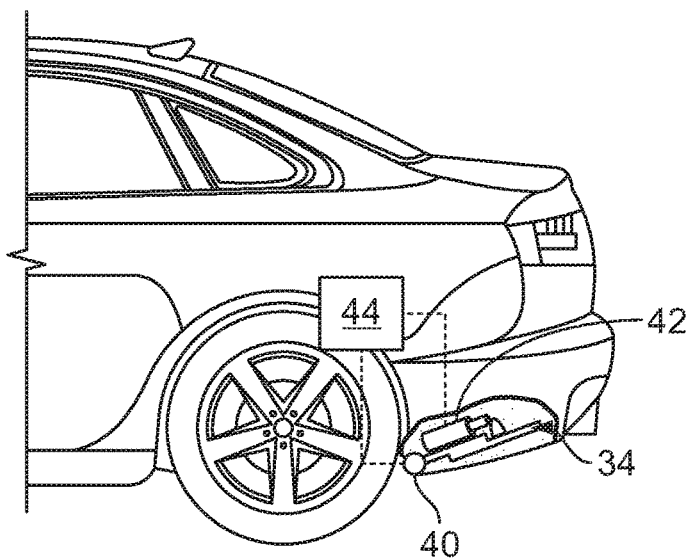
FIG. 3 is a first side view of an automotive vehicle according to an embodiment of the present disclosure.
Figure 4:
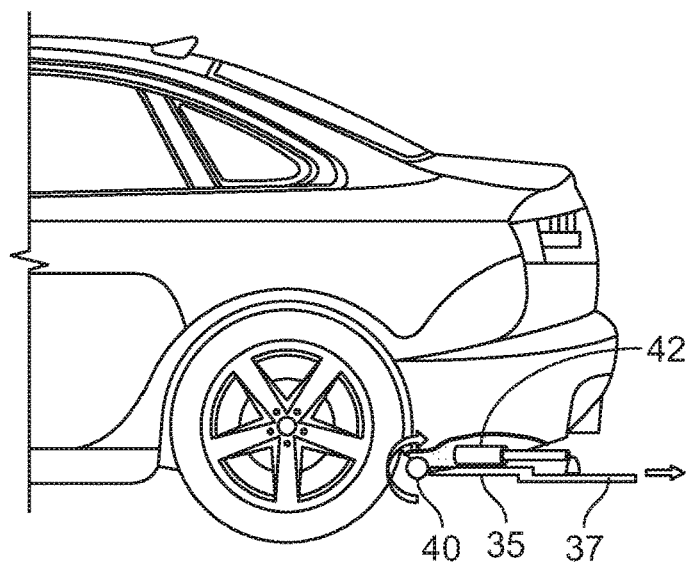
FIG. 4 is a second side view of an automotive vehicle according to an embodiment of the present disclosure.

As shown in FIGS. 2-4, the vehicle 10 also includes an active diffuser assembly 32 disposed at the rear end 18 proximate to the underbody portion 26. The active diffuser assembly 32 is configured to control the first airflow portion 25-1 past the underbody portion 26 through the underbody and out to the ambient. The active diffuser assembly 32 includes a panel 34 configured to selectively extend into and retract from the ambient airflow 25 in the recirculating airflow region 25-5. The retracted or stowed position is illustrated in FIG. 3, and the extended or deployed position is illustrated in FIG. 4. The panel 34 extends from a fore edge 36 to an aft edge 38. In the illustrated embodiment the fore edge 36 is disposed proximate a rear axle 39. However, in other embodiments the fore edge 36 may be positioned in other locations, e.g. further aft of the rear axle 39. In the illustrated embodiment the panel 34 extends substantially a full width of the vehicle from the left side 20 to the right side 22. However, in other embodiments, the panel 34 may extend a smaller portion of the width of the vehicle. In the illustrated embodiment, the panel 34 includes a first portion 35 and a second portion 37

As shown in FIGS. 2, 3, and 4, the active diffuser assembly 32 also includes a first device 40 configured to pivot the panel 34 relative to the underbody portion 26 when the vehicle 10 is in motion relative to the road surface 12. The panel 34 is configured to pivot about a pivot axis extending generally along the fore edge 36. In the embodiment illustrated in FIGS. 1 through 4, the first device 40 is configured as an active actuator, e.g. as a motor configured to act directly at the pivot axis, or as a linear actuator configured to act tangentially to the pivot axis. However, in other embodiments other types of actuation may be implemented, as discussed in further detail below. In addition, the active diffuser assembly 32 includes a second device 42 configured to extend the panel 34 in a fore-aft direction. The second device 42 may be configured as an active, linearly-extending actuator as shown in FIG. 2, which may, for example, be a fluidly actuated device, or configured as a servomotor or a solenoid. The first device 40 and the second device 42 may each include a single actuator or a plurality of individual actuators. In embodiments where a plurality of individual actuators are used, the actuators may be located symmetrically along the rear end 18 in order to facilitate uniform extension and retraction of the panel 34 relative to both the left side 20 and the right side 22. The first device 40 and the second device 42 may be dual-action, e.g. configured to move the panel 34 from the stowed position to the deployed position and to move the panel 34 from the deployed position to the stowed position.

In the deployed position at elevated vehicle speeds, the extended panel 34 permits the first airflow portion 25-1 to expand in the underbody space. However, expansion of the first airflow portion 25-1 by the diffuser assembly 32 while the panel 34 is extended does not cause excessive airflow separation or drag on the vehicle body 14. On the contrary, such extension of the panel 34 enhances the aerodynamic profile of the vehicle body 14 by providing a degree of "wake infill", i.e., filling of the recirculating airflow region 25-5 immediately behind the moving vehicle. Furthermore, the active diffuser assembly 32 causes the flow of the air upstream of the panel 34 to accelerate through the underbody portion 26, thus generating a downforce and an attendant drag reduction on the vehicle body 14.

The enhanced aerodynamic profile of the vehicle body 14 may provide a benefit with respect to fuel economy and/or with respect to the noise level being perceived by the occupants of vehicle 10, and additionally reduce quantities of dirt or debris collecting on the rear end 18. Additionally, the dual-action type of first device 40 may be configured to extend the panel 34 for a predetermined distance past the rear end 18 such that the extension of the panel provides the desired aerodynamic benefit, i.e., drag reduction on the vehicle body 14.

As an additional benefit, when in the deployed position the panel 34 may function as a supplemental rear bumper. The panel 34 may therefore be controlled as an active safety device, as will be discussed in further detail below.

The first device 40 and the second device 42 are in communication with or under the control of a controller 44. While depicted as a single unit, the controller 44 may include one or more additional controllers collectively referred to as a "controller." The controller 44 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

Figure 5:
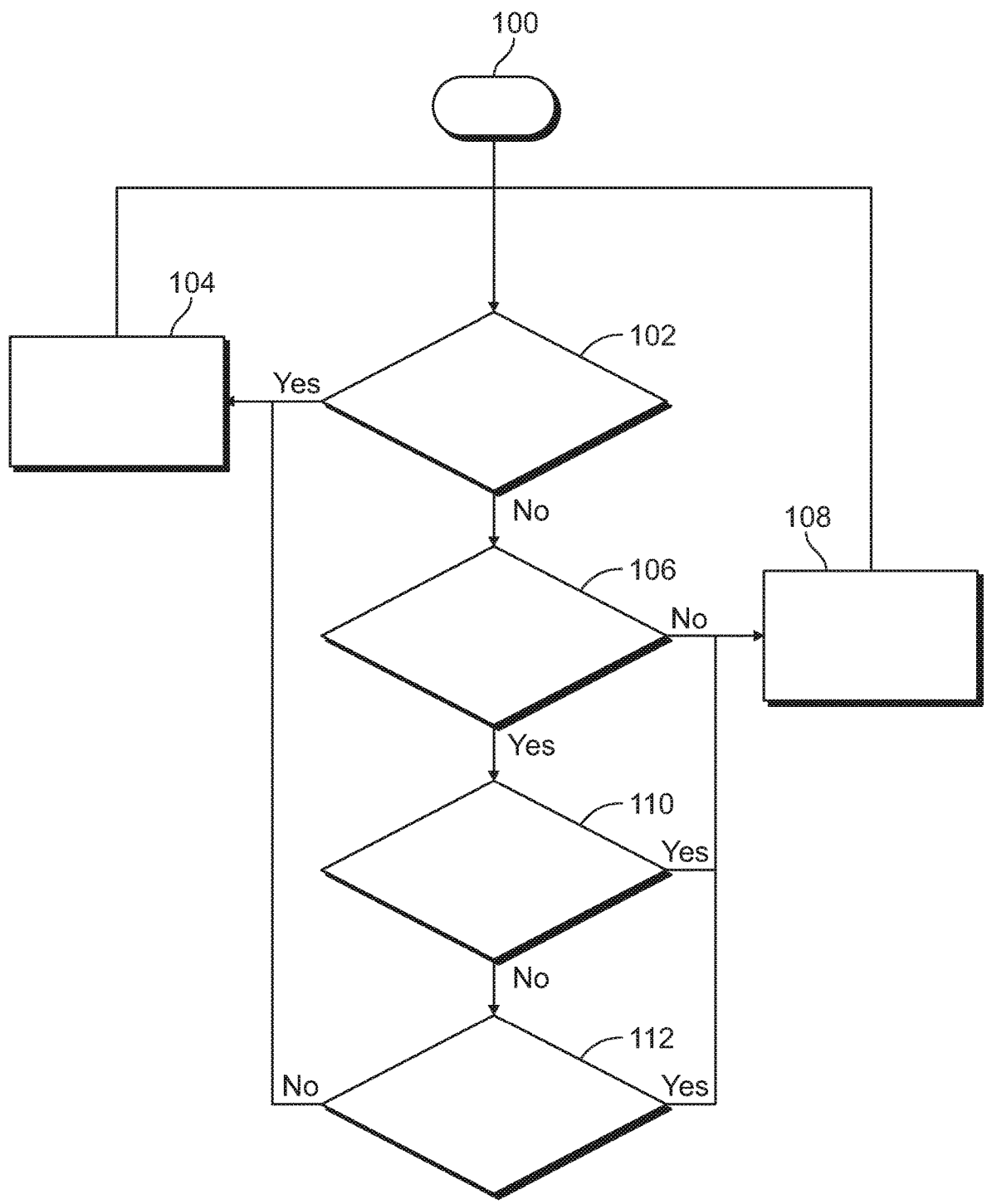
FIG. 5 is a flowchart representation of a method of controlling an automotive vehicle according to an embodiment of the present disclosure.

Referring now to FIG. 5, a method of controlling a vehicle according to the present disclosure is illustrated in flowchart form. The method begins at block 100, e.g. at the beginning of a drive cycle. In an exemplary embodiment, the method is performed automatically by a controller, e.g. arranged as the controller 44 discussed above.

A determination is made of whether a rear impact is anticipated, as illustrated at operation 102. In an exemplary embodiment, a rear impact may be anticipated based on sensor readings from one or more aft-facing sensors such as RADAR, LiDAR, or optical cameras. A rear impact may be anticipated based on a detected object aft of the vehicle 10 having a relative velocity and relative acceleration indicating a likely collision with the rear end 18.

If the determination of operation 102 is positive, i.e. a rear impact is anticipated, then the diffuser is controlled to the deployed position, as illustrated at block 104. In an exemplary embodiment, this is performed by controlling one or more actuators, e.g. the first device 40 and the second device 42, to control the panel 34 to the deployed position. The diffuser may thereby function as a supplemental rear bumper during any collision which may occur. Control then returns to operation 102.

If the determination of operation 102 is negative, then a determination is made of whether a current vehicle speed exceeds a predetermined velocity threshold, as illustrated at operation 106. In an exemplary embodiment, the velocity threshold is determined by any appropriate method for identifying the speed of vehicle 10 above which an enhanced aerodynamic profile of the vehicle body 14 imparts a desired benefit to vehicle efficiency, e.g. through wind tunnel testing, simulation, other methods, or combination thereof.

If the determination of operation 106 is negative, i.e. current vehicle speed does not exceed the velocity threshold, then the diffuser is controlled to the stowed position, as illustrated at block 108. In an exemplary embodiment, this is performed by controlling one or more actuators, e.g. the first device 40 and the second device 42, to control the panel 34 to the stowed position. Control then returns to operation 102.

If the determination of operation 106 is positive, then a determination is made of whether a steering angle exceeds a predetermined steering threshold, as illustrated at operation 110. In an exemplary embodiment, the steering threshold is determined by any appropriate method for identifying a rate of turning above which the diffuser does not provide additional benefit.

If the determination of operation 110 is positive, i.e. the steering angle exceeds the steering threshold, then the diffuser is controlled to the stowed position, as illustrated at block 108. Control then returns to operation 102.

If the determination of operation 110 is negative, then a determination is made of whether a current brake application exceeds a predetermined braking threshold, as illustrated at operation 112. In an exemplary embodiment, the braking threshold is determined based on a level corresponding to intentional application of vehicle brakes, e.g. signifying an operator's intention to significantly decelerate the vehicle 10.

If the determination of operation 112 is positive, i.e. the brake application exceeds the braking threshold, then the diffuser is controlled to the stowed position, as illustrated at block 108. Control then returns to operation 102.

If the determination of operation 112 is negative, then the diffuser is controlled to the deployed position, as illustrated at block 104. Control then returns to operation 102.

As may be seen, the system may thereby be controlled to provide enhanced aerodynamic performance when desirable and function as an active safety device when needed, while also maintaining desired vehicle styling when neither function is necessary.

Figure 6:
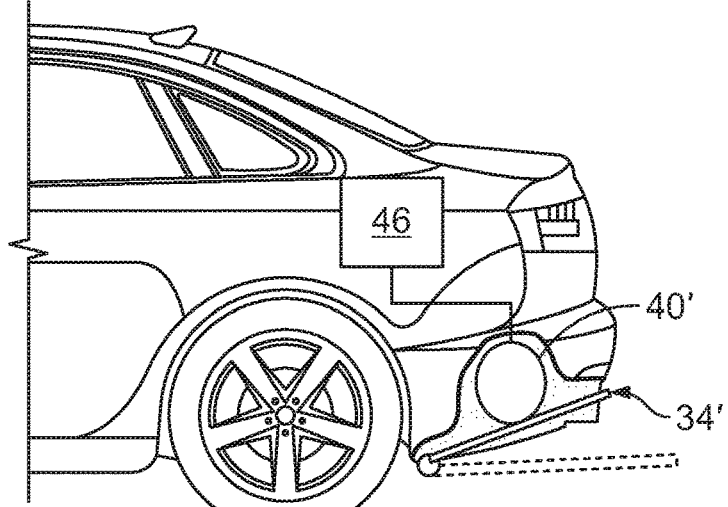
FIG. 6 is a side view of an automotive vehicle according to an alternate embodiment of the present disclosure.

Referring now to FIG. 6, an alternate embodiment is illustrated. In the embodiment of FIG. 7, the first device 40' comprises an inflatable diaphragm. In such embodiments, the first device 40' is configured to, when inflated, contact the panel 34' and drive the panel 34' in pivoting motion. A biasing member such as a spring may be provided to bias the panel 34' toward the stowed position. The first device 40' is in communication with a fluid source 46. The fluid source 46 is configured to supply fluid to the first device 40' to inflate the diaphragm in response to satisfaction of an operating condition. In an exemplary embodiment, the fluid source 46 comprises an air pump configured to supply pressurized air to the first device 40'. In an alternate embodiment, the fluid source 46 comprises an inlet at the exterior of the vehicle 10. In such embodiments, at high vehicle speeds, air may flow through the inlet to pressurize the first device 40'. Such embodiments may thereby function as a passive actuator.

As may be seen, the present disclosure provides a system and method for providing enhanced aerodynamic performance when desired, and moreover may do so without compromising desired vehicle styling.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
   a body having a fore portion, an aft portion, and an underbody portion;
   a panel pivotably coupled to the underbody portion proximate the aft portion of the body, the panel having a fore edge and an aft edge and being pivotable about the fore edge;
   the panel being pivotable between a stowed position and a deployed position, wherein in the stowed position the aft edge is spaced a first distance from a driving surface and in the deployed position the aft edge is spaced a second distance from the driving surface, the second distance being less than the first distance;
   an actuator configured to move the panel between the stowed position and the deployed position in response to satisfaction of an operating condition; and
   a controller configured to control the actuator to move the panel between the stowed position and the deployed position in response to satisfaction of the operating condition, wherein the operating condition comprises an anticipated rear impact.

2. The vehicle of claim 1, wherein the panel comprises a first portion slidably coupled to a second portion, the first portion and second portion being slidable between a retracted position defining a first length between the fore edge and the aft edge and an extended position defining a second length between the fore edge and the aft edge, the second length exceeding the first length.

3. The vehicle of claim 2, further comprising a second actuator configured to slide the first portion and the second portion between the retracted position and the extended position.

4. The vehicle of claim 1, further comprising a first axle and a second axle, the fore edge being disposed proximate the second axle.

5. The vehicle of claim 1, wherein the actuator comprises an inflatable diaphragm configured to, when inflated, pivot the panel to the deployed position.

6. A method of controlling a vehicle, comprising:
   providing a vehicle having an aft portion, an underbody portion, a panel pivotably coupled to the underbody portion proximate the aft portion, the panel having a fore edge and an aft edge and being pivotable about the fore edge, at least one actuator configured to move the panel between a stowed position and a deployed position, and a controller configured to control the at least one actuator;
   in response to satisfaction of a first operating condition, automatically controlling the at least one actuator, via the controller, to move the panel from the stowed position to the deployed position, wherein the first operating condition comprises an anticipated rear impact; and
   in response to satisfaction of a second operating condition, automatically controlling the at least one actuator, via the controller, to move the panel from the deployed position to the stowed position, wherein in the stowed position the aft edge is spaced a first distance from a driving surface and in the deployed position the aft edge is spaced a second distance from the driving surface, the second distance being less than the first distance.

7. The method of claim 6, wherein the panel comprises a first portion slidably coupled to a second portion, the first portion and second portion being slidable between a retracted position defining a first length between the fore edge and the aft edge and an extended position defining a second length between the fore edge and the aft edge, the second length exceeding the first length, wherein automatically controlling the at least one actuator to move the panel from the stowed position to the deployed position comprises controlling the at least one actuator to move the panel from the retracted position to the extended position, and wherein automatically controlling the at least one actuator to move the panel from the deployed position to the stowed position comprises controlling the at least one actuator to move the panel from the extended position to the retracted position.

8. The method of claim 6, wherein the first operating condition includes vehicle speed exceeding a predefined threshold, and wherein the second operating condition includes vehicle speed falling below the predefined threshold.

* * * * *